Patented Feb. 14, 1939

2,147,226

UNITED STATES PATENT OFFICE 2,147,226

MANUFACTURE OF 1-DIMETHYLAMINO-2,3-PROPANEDIOL

Francis N. Alquist and Harold R. Slagh, Midland, Mich., assignors to The Dow Chemical Company, Midland, Mich., a corporation of Michigan No Drawing. Application February 6, 1937, Serial No. 124,471

5 Claims. (Cl. 260—584)

This invention relates to an improved method of making 1-dimethylamino-2,3-propanediol from glycerol monochlorhydrin and dimethylamine.

1-dimethylamino-2,3-propanediol, otherwise called "methicol", has been prepared in the laboratory by heating glycerol monochlorhydrin and dimethylamine in a closed tube at 100° C. for 8 hours (Roth, Ber. 15, 1153). The reaction involved in this process may be represented by the following equation:

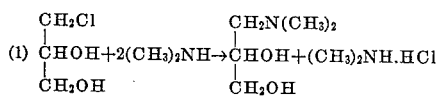

As indicated in the equation, approximately half of the dimethylamine entering into the reaction is converted into the undesired by-product, dimethylamine hydrochloride. Thus, for economic operation in accordance with the known method, the employment of a large excess of dimethylamine and extra steps for the recovery of dimethylamine from the hydrochloride are required. An object of the present invention is to provide a method whereby such disadvantages may be avoided. Other objects will be apparent from the following description of the invention.

We have found that the yield of methicol based on the dimethylamine employed may be increased and the formation of dimethylamine hydrochloride avoided by carrying the reaction between dimethylamine and glycerol monochlorhydrin out in the presence of an alkali; e. g., sodium hydroxide, sodium carbonate, lime, etc. We have also discovered that the yield of methicol may be increased still further by adding the glycerol monochlorhydrin gradually to an aqueous mixture of the dimethylamine and alkali and carrying the entire reaction out at temperatures not materially exceeding 50° C. Our invention, then, consists in the method hereinafter fully described and particularly pointed out in the claims.

Our method for making methicol consists essentially in forming an aqueous mixture of glycerol monochlorhydrin, dimethylamine, and an alkali, carefully controlling the temperature at which such mixture reacts, and finally separating the methicol, e. g., by distillation. Various mild inorganic alkaline agents may be used in the reaction, but the stronger alkalies, e. g., sodium hydroxide or lime, are preferred.

Although the relative proportions of the reacting substances in our process may be varied widely, we prefer to employ approximately one chemical equivalent of alkali and a molecular excess, e. g., 1.5 moles, of dimethylamine per mole of glycerol monochlorhydrin. When such excess of dimethylamine is used, it is not essential that all of the alkali be present at the start of reaction; i. e., a portion of the alkali may be added after reaction is over, thereby aiding in the recovery of any unreacted dimethylamine. Furthermore, although the reaction between dimethylamine and glycerol monochlorhydrin in an aqueous alkaline solution will take place over a wide range of temperatures, we prefer to maintain the reacting mixture at a temperature below 50° C., in order to avoid undesirable side reactions, which frequently occur to considerable extent at higher temperatures. The reaction for the formation of methicol is exothermic and liberates much heat. Accordingly, cooling is usually resorted to in order to avoid spontaneous heating of the mixture to temperatures above 50° C. We have found that by adding the glycerol monochlorhydrin gradually, with stirring, to the aqueous mixture of dimethylamine and alkali, the heat generated by the reaction is dissipated much more efficiently than when the agents are mixed in other ways, and the artificial cooling required in order to control the temperature may be reduced correspondingly, or entirely eliminated.

In carrying out our process, we first prepare an aqueous solution of dimethylamine and at least half the alkali. This solution is then reacted with the glycerol monochlorhydrin at such rate that the temperature does not exceed about 50° C. After all the glycerol monochlorhydrin has been added, the mixture is allowed to stand at a temperature below 50° C., usually for 18–30 hours. The remainder of the alkali is then added to the mixture, after which the methicol product is separated, e. g. by fractional distillation under reduced pressure.

The following example illustrates a preferred way of practicing the invention, but is not to be construed as limiting the invention.

880 lbs. of 24.5% aqueous dimethylamine solution and 150 lbs. of 40% sodium hydroxide solution were mixed together in a closed reactor equipped with an agitator and with coils through which cooling water could be circulated. A total of 400 lbs. of glycerol monochlorhydrin was added in 20 lb. lots, one lot every fifteen minutes. The reaction mixture was maintained at 20° C.–40° C. throughout the run. At times the pressure in the reactor rose to 10–15 lbs. per sq.

in. The batch was allowed to stand 24 hours, after which 150 lbs. of 40% sodium hydroxide was added. The reactor was then opened and the mixture was gradually heated to 105° C., the unreacted dimethylamine distilling therefrom being absorbed in water. The water was distilled from the remaining mixture at 2 inches absolute pressure. The residue from the distillation was cooled to 40° C. and mixed with 335 lbs. of methanol, whereupon sodium chloride precipitated from the mixture. The precipitate was removed in a centrifuge, after which methanol was recovered from the liquor by distillation at 2 inches absolute pressure. 430 lbs. of methicol, 98.4% pure, was obtained.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making 1-dimethylamino-2,3-propanediol by reaction of glycerol monochlorhydrin with dimethylamine, the step which comprises carrying out the reaction in the presence of an aqueous alkali.

2. In a method of making 1-dimethylamino-2,3-propanediol by reaction of glycerol monochlorhydrin with dimethylamine, the steps which comprise carrying out the reaction in the presence of an aqueous alkali and at a temperature below approximately 50° C.

3. In a method of making 1-dimethylamino-2,3-propanediol by reaction of glycerol monochlorhydrin with dimethylamine, the step which comprises adding glycerol monochlorhydrin to an aqueous mixture of dimethylamine and an alkali.

4. In a method of making 1-dimethylamino-2,3-propanediol by reaction of glycerol monochlorhydrin with dimethylamine, the step which comprises adding glycerol monochlorhydrin to an aqueous mixture of dimethylamine and an alkali at such rate that the temperature of the mixture does not exceed 50° C.

5. In a method of making 1-dimethylamino-2,3-propanediol by reaction of glycerol monochlorhydrin with dimethylamine, the steps which comprise adding one molecular equivalent of glycerol monochlorhydrin to an aqueous mixture of more than one molecular equivalent of dimethylamine and less than one chemical equivalent of an alkali at such rate that the temperature of the mixture does not exceed 50° C., allowing the mixture to stand, adding more alkali, distilling off unreacted dimethylamine and separating the 1-dimethylamine-2,3-propanediol product.

FRANCIS N. ALQUIST.
HAROLD R. SLAGH.